United States Patent [19]

Johnston et al.

[11] 4,222,395
[45] Sep. 16, 1980

[54] THRESHING CAGE FINGERS FOR RETARDING THE FLOW OF MATERIAL THROUGH AN AXIAL FLOW HARVESTER

[75] Inventors: David K. Johnston, Blue Springs; Michael R. Stuber, Raytown, both of Mo.

[73] Assignee: Allis-Chalmers Corporation, Milwaukee, Wis.

[21] Appl. No.: 34,345

[22] Filed: Apr. 30, 1979

Related U.S. Application Data

[63] Continuation of Ser. No. 900,170, Apr. 26, 1978, abandoned.

[51] Int. Cl.³ .............................................. A01F 12/20
[52] U.S. Cl. .............................. 130/27 T; 130/27 H
[58] Field of Search ............ 56/14.6; 130/27 R, 27 H, 130/27 HF, 27 HA, 27 G, 27 M, 27 T

[56] References Cited

U.S. PATENT DOCUMENTS

| | | | |
|---|---|---|---|
| 3,306,302 | 2/1967 | Mark et al. | 130/27 H |
| 4,075,823 | 2/1978 | Rowland-Hill | 56/14.6 |
| 4,108,150 | 8/1978 | Sharer | 56/14.6 |
| 4,175,568 | 11/1979 | Nooyen | 56/14.6 |

Primary Examiner—Robert A. Hafer
Attorney, Agent, or Firm—Charles L. Schwab

[57] ABSTRACT

Removable flow retarding finger attachment is mounted on the outside of the perforated cylinder cage of an axial flow harvester with fingers extending through the openings in the cage to slow the axial flow of crop material through the spirally ridged cage. Two embodiments of the invention are illustrated. In one version, the finger attachment is removably secured to the cage in a flow retarding position by releasable fastening means. In the other version, power means is provided to permit selective adjustment of the fingers between flow retarding and retracted positions.

13 Claims, 7 Drawing Figures

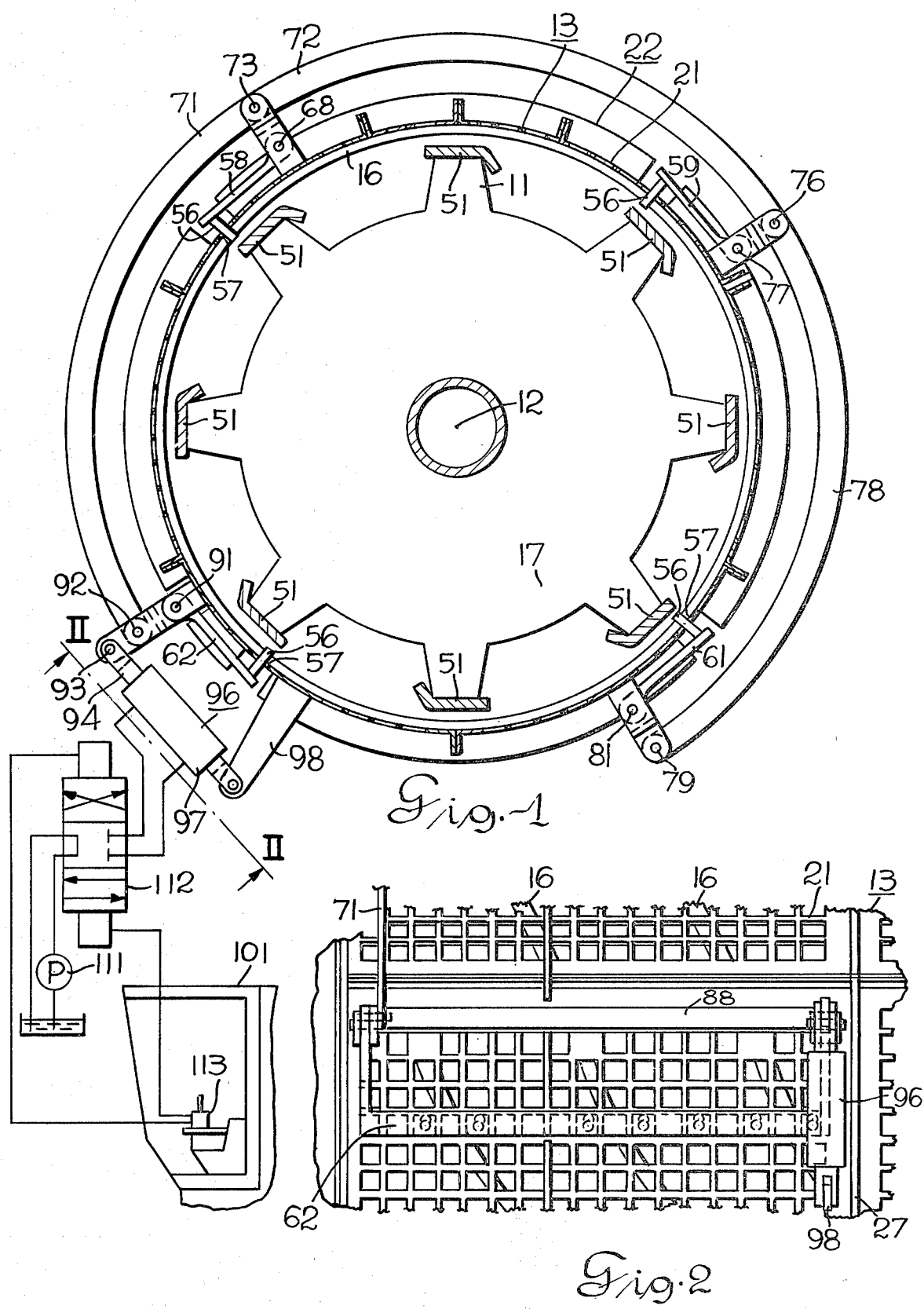

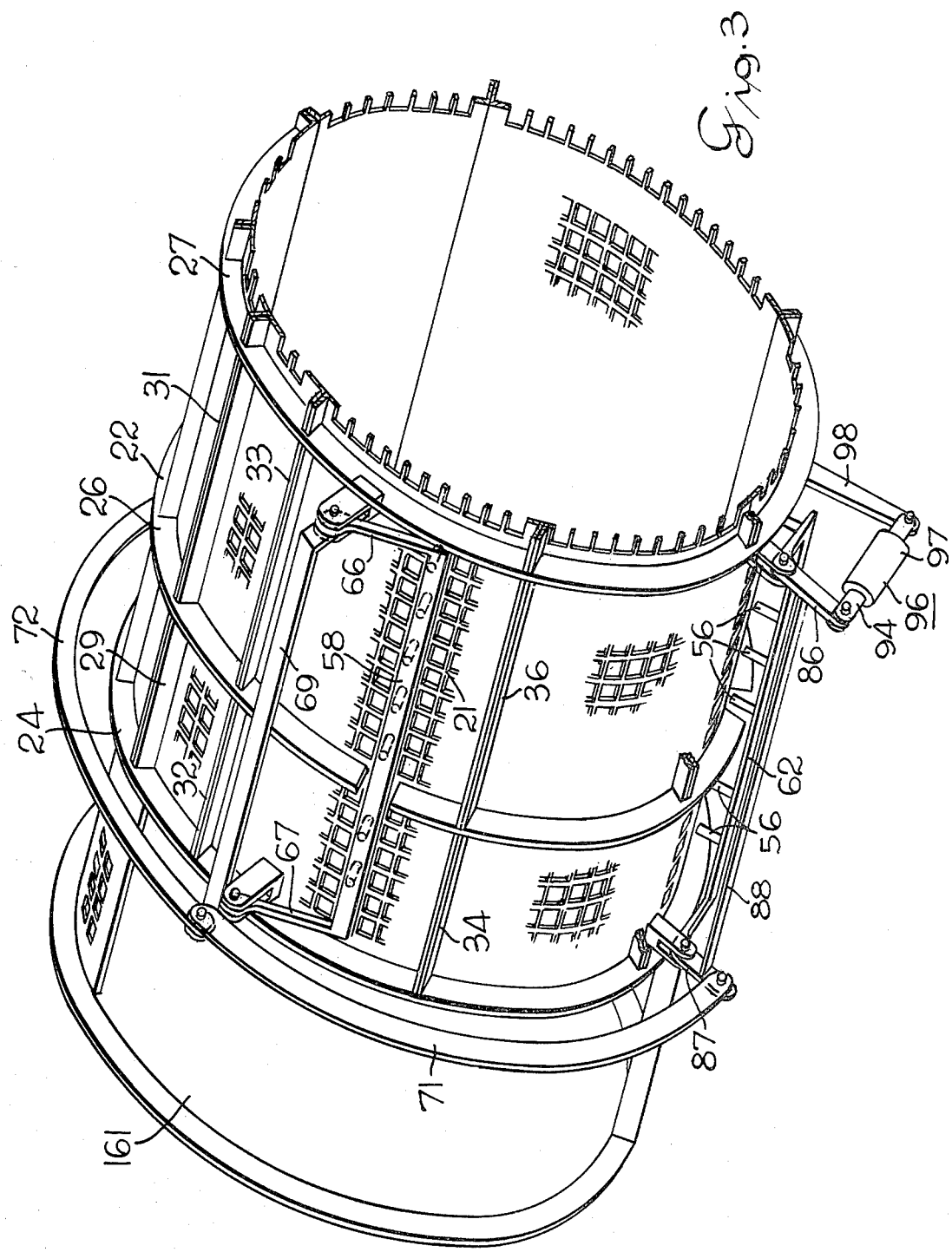

THRESHING CAGE FINGERS FOR RETARDING THE FLOW OF MATERIAL THROUGH AN AXIAL FLOW HARVESTER

This is a continuation of application Ser. No. 900,170, filed Apr. 26, 1978, now abandoned.

This invention relates to means for retarding the axial flow of crop material through the perforated cage of an axial flow harvester.

BACKGROUND OF THE INVENTION

Heretofore, others have fastened axially extending bars or channels to the inside of the cylinder cage or concave to retard the axial flow of crop material so as to subject the crop material to increased threshing as it passes through the threshing section of the harvester.

U.S. Pat. No. 3,529,645 illustrates a spiked threshing rotor cooperating with cob grinding and corn kernel cracking spikes on the casing surrounding the rotor. U.S. Pat. No. 3,618,616 shows spikes secured to the threshing rotor, the concave and the interior wall of the cylindrical casing to comb or rake the straw when operating in weedy or damp straw conditions or when harvesting rice.

SUMMARY OF THE INVENTION

It is a general purpose of this invention to provide removable fingers on the perforated cage surrounding the threshing rotor for retarding the axial flow of crop material so as to improve the separation of seeds from the stalk or cob. The invention is readily incorporated in an axial flow harvester having a threshing rotor, a foraminous cylindrical cage with radial openings permitting crop seeds to pass therethrough and means for inducing axial flow of crop material upon rotation of the rotor. The invention includes the provision of fingers for retarding flow of crop material which are connected to the radially outer side of the cage and extend radially inward through the openings in the cage. Motion transmitting means may be provided which are operable to move the fingers between flow retarding and retracted positions or the fingers may be releasably secured to the outside of the cage by releasable fastening means. The fingers may be secured to one or more members extending axially relative to the cage with the fingers aligned with the radial openings in the cage. Each member may be releasably secured to radially outwardly extending annular flanges on the cage or pivotally connected to the cage on a axis parallel to the cage axis for movement by actuating means between a flow retarding position in which the fingers extend into the interior of the cage and a retracted position in which the fingers are substantially withdrawn from the interior of the cage. The actuating means may be operated from a remote position and may include a linear actuator.

BRIEF DESCRIPTION OF THE DRAWINGS

Two embodiments of the invention are illustrated in the drawings in which:

FIG. 1 is a sectional view of the thresing rotor and perforated cage in which a remote control embodiment of the present invention is illustrated;

FIG. 2 is view taken along the line II—II in FIG. 1;

FIG. 3 is a perspective view of the embodiment illustrated in FIGS. 1 and 2 with the fingers in their retracted positions;

DETAILED DESCRIPTION OF THE DRAWINGS

Figure 4:
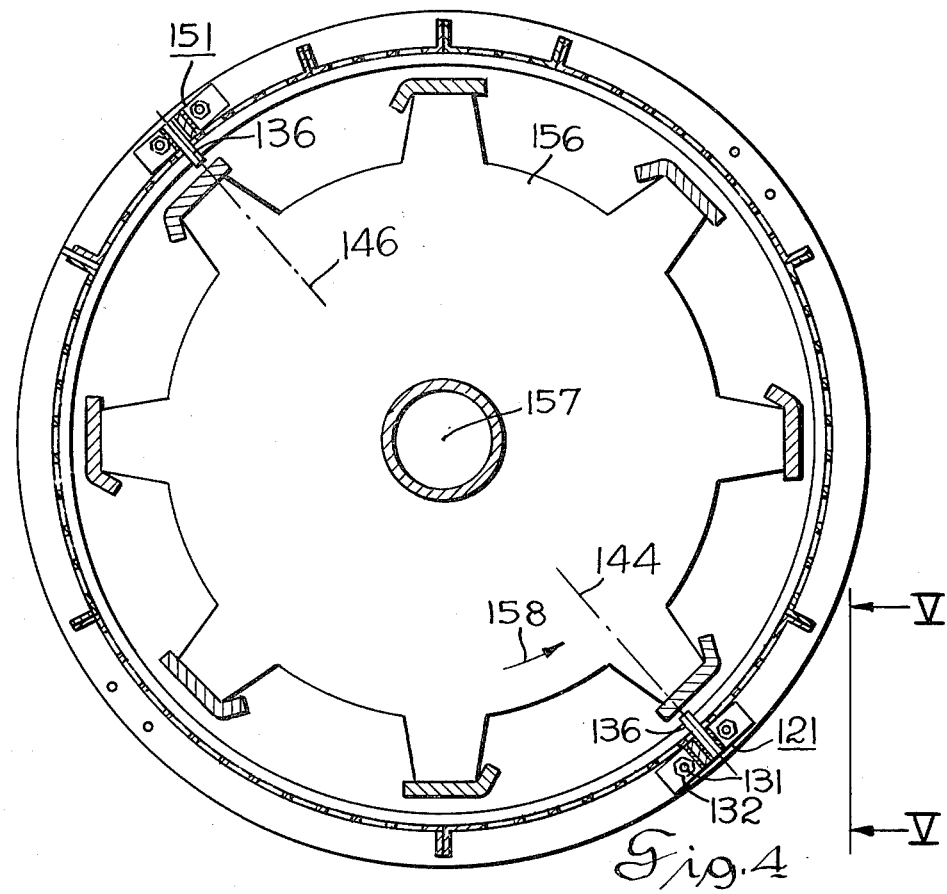
FIG. 4 is a sectional view of the threshing rotor and perforated cage of a harvester illustrating a second embodiment of the present invention.

A remotely controlled power operated version of the present invention is illustrated in FIGS. 1, 2 and 3 in which the threshing rotor 11 is mounted in an axial flow harvester, by means not shown, for rotation about an axis 12. The present invention is particularly useful in an axial flow harvester of the type shown in U.S. Pat. No. 4,007,744, J. Lyle Shaver, Grain Accelerator Precleaner. The rotor 11 is surrounded by a cylindrical cage 13 which is coaxial with the rotor 11. The cage 13 is a stationary structure and is securely fastened to the combine by appropriate means, not shown. Spiral ridge means are presented on the inside of the cage by helical bars 16 which induce axial flow of crop material through the cage when the rotor 11 is rotated in the direction indicated by the arrow 17. The rotor 11 is equipped with axially extending bars 51 which are spaced a predetermined distance radially inwardly from the radially inner surface of the helical bars 16. As shown in FIG. 3, the foraminous cylindrical cage 13 is made up of sections which are bolted together. Typically, each section includes a screen 21 supported on the inside of a cylindrical lattice 22 comprised of an axial spaced series of radially outwardly extending annular flanges 24, 26, 27 and axially extending cross braces 29, 31, 32, 33, 34, 36.

In harvesting some crops, it is desirable to slow the flow of crop material through the cage and in order to do so, this invention provides retractable fingers 56 which are radially aligned with openings 57 in the cage 13. The openings 57 are considerably larger than necessary to permit the passage of crop seeds. The fingers 56 are rigidly secured, as by welding, to four members, 58, 59, 61, 62. Members 58, 59 and 61 are identical in construction and only member 58 will be discussed in detail. Member 58 includes bell crank shaped end portions 66, 67 which are pivotally connected at their respective bends on an axis 68 which is parallel to axis 12 of the cage 13 and spaced circumferentially from the fingers 56. The radially outwardly extending part of bell crank portions 66, 67 are rigidly interconnected by a cross brace 69 and the bell crank 67 extends radially outwardly an additional distance where it is pivotally connected to overlapping ends of a pair of circumferentially extending, arcuate links 71, 72 on the axis 73. The other end of the arcuate line 72 is connected to member 59 on an axis 76 which is spaced radially outwardly from the axis 77 on which the member 59 pivots relative to the cage. An arcuate link 78 is pivotally connected at its opposite ends to the members 59 and 61 on axes 76 and 79. Axis 79 is disposed radially outwardly of an axis 81 on which member 61 is pivotally mounted on the cage 13. The member 62 includes bell crank end portions 86, 87 whose radially outwardly extending legs are reinforced by a rigidly secured cross brace 88. The bell crank portions 86, 87 are pivotally connected at their respective bends to brackets on the cage 13 for pivotal movement about an axis 91 which is parallel to the cage axis 12. The end of arcuate link 71 is pivotally connected to the bell crank portion 87 on axis 92. The radially outwardly extending end of bell crank shaped portion 86 of member 62 is pivotally connected on an axis 93 to the piston rod 94 of a double acting hydraulic actuator 96. A cylinder 97 of the actuator 96 is pivotally connected to a bracket 98 secured as by welding to the cage 13. It should be understood that all the axes 12, 68, 73, 76, 77, 79, 81, 91, 92 and 93 are parallel to one another.

As shown in FIG. 1, the fingers 56 are in their flow retarding position in which the fingers extend radially inward through the openings 57 into the interior of the cage 13. The double acting hydraulic jack 96 provides a motion transmitting means by which the fingers 56 may be moved to a retracted position, as shown in FIG. 3, wherein they are withdrawn from the interior of the cage 13. The double acting hydraulic jack 96 is a linear actuator which may be controlled from a remote position such as the operator station 101 which represents the cab on the harvester on which the invention is incorporated. The positioning means for the fingers 56, as illustrated in FIGS. 1, 2 and 3 include power operated means for adjusting the fingers between their flow retarding and retracted positions which includes the linear actuator in the form of the hydraulic jack 96, a source of power in the form of a hydraulic pump 111, an appropriate solenoid operated control valve 112 and an electric control 113 for operating the solenoid valve 112.

Figure 5:
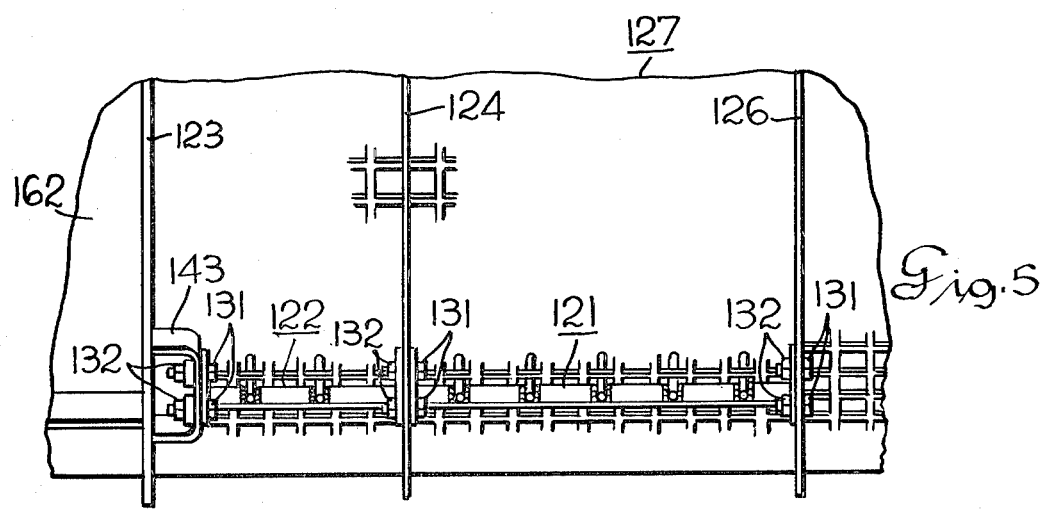
FIG. 5 is a view taken along the line V—V in FIG. 4.
Figure 7:
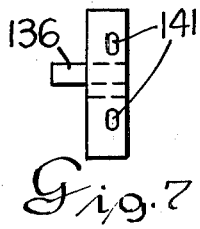
FIG. 7 is an end view of the finger attachment shown in FIG. 6.
Figure 6:
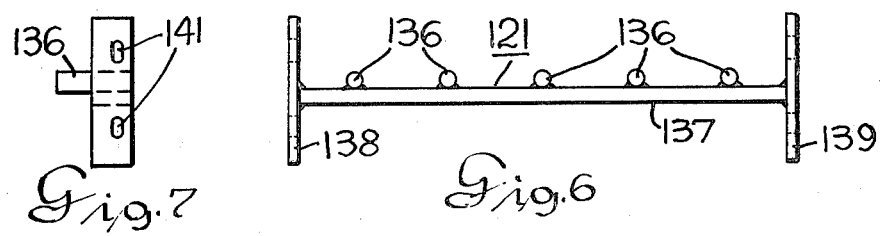
FIG. 6 is a top view of a finger attachment.

The second embodiment of the invention illustrated in FIGS. 4–7, shows removable finger attachments 121, 122 releasably secured to annular flanges 123, 124, 126 of the foraminous or perforated cage 127 by releasable fastening means or fasteners in the form of bolts 131 and nuts 132. The finger attachment 121 includes parallel fingers 136, welded to a member 137 having mounting flanges 138, 139 weided to its opposite ends. The flanges have openings 141 therein through which the bolts 131 extend. Appropriate openings are provided for the bolts 131 in the annular flanges 124, 126 and in the U-shaped bracket 143 welded to annular flange 123. When installed by the positioning means in the form of bolts 131 and nuts 132 the fingers 136 of attachment 121 lie in an axially extending plane 144 and likewise the fingers 136 of finger attachment 151 lie in an axially extending plane 146. It should be understood that the finger attachments 122 and 151 are constructed in a manner similar to attachment 121. The cage 127 and threshing rotor 156 of the second embodiment (FIGS. 4–7) have a common axis 157 with the rotor 156 rotating in the direction indicated by arrow 158.

The present invention permits the positioning of fingers through radial openings of the threshing cage of an axial flow harvester to retard or slow the flow of crop material through the cage. The fingers are installed in the separating section of the cage, that is, axially adjacent the discharge opening 161 in FIG. 3 or discharge opening 162 in FIG. 5. When the fingers are positioned to extend into the interior of the cage, as illustrated in FIGS. 1, 2, 4 and 5, the crop material is subjected to additional separating action because its axial flow through the interior of the cage is slowed down as compared to its flow when the fingers are in their retracted position as shown in FIG. 3. The invention has been found useful in certain corn harvesting conditions and is also useful where additional grain separation action is desired.

The embodiments of the invention in which an exclusive property or privilege is claimed are defined as follows:

1. In an axial flow harvester, the combination of:
   In an axial flow harvester, the combination of:
   a threshing rotor,
   a foraminous cylindrical cage surrounding said rotor in coaxial relation thereto with radial openings permitting crop seeds to pass therethrough,
   means for inducing axial flow of crop material through said cage upon rotation of said rotor, and
   means for retarding said flow of crop material including
     a member on the radially outer side of said cage extending axially of the latter,
     a plurality of fingers on said member extending radially inwardly through said openings in said cage and positioning means connecting said member to the outside of said cage.

2. The harvester of claim 1 wherein said positioning means includes releasable fastening means.

3. The harvester of claim 1 wherein said cage includes a pair of radially outward extending annular flanges and wherein said positioning means includes releasable fasteners connecting axially spaced portions of said member to said flanges.

4. The harvester of claim 1 wherein said positioning means includes power operated means for selectively adjusting said member radially in relation to said cage between a flow retarding position in which said fingers extend into the interior of said cage and a retracted position in which said fingers are withdrawn from the interior of said cage.

5. The harvester of claim 4 wherein said member is pivotally connected to the outside of said cage on a pivot axis parallel to the axis of said cage and wherein said fingers are spaced circumferentially from said pivot axis.

6. The harvester of claim 5 wherein power operated means includes a linear actuator interposed between said cage and said member.

7. The harvester of claim 6 wherein said power operated means includes a source of power connected to said linear actuator and a remotely operated control associated with said power operated means for selectively operating said linear actuator.

8. The harvester of claim 1 wherein said positioning means includes means for selectively shifting said member relative to said cage to shift said fingers between flow retarding and retracted positions.

9. The harvester of claim 1 wherein said positioning means permits selective positioning of said fingers in flow retarding and retracted positions.

10. The harvester of claim 1 wherein said fingers are parallel to one another and lie in a plane parallel to the axis of said cage.

11. In an axial flow harvester, the combination of:
    a threshing rotor,
    a foraminous cylindrical cage surrounding said rotor in coaxial relations thereto with radial openings permitting crop seeds to pass therethrough,
    means for inducing axial flow of crop material through said cage upon rotation of said rotor, and
    means for retarding said flow of crop material including
      a pair of circumferentially spaced finger supporting members disposed on the outside of said cage and extending axially thereof a plurality of radially extending fingers on each of said finger supporting members, each of said fingers being in radial alignment with one of said radial openings in said cage, said fingers on said pair of finger supporting members lying, respectively, in two axially extending planes, means pivotally connecting said finger supporting members on said cage on circumferentially spaced rocking axes parallel to the axis of said cage for pivotal movement between a retarding position in which said fingers extend radially into the interior of said cage and a retracted position in which said fingers are substantially withdrawn from the interior of said cage, a circumferentially extending link member pivotally connected to said finger supporting members on parallel axes spaced radially from said rocking axes whereby said finger supporting members pivot simultaneoulsy to move the fingers thereon in the same radial direction relative to the cage, and actuating means connected to at least one of said members and operable to pivot said finger supporting members between said retarding and retracted positions.

12. the harvester of claim 11 wherein said actuating means includes a motion transmitting device and a remotely positioned control therefor.

13. In an axial flow harvester, the combination of:

a threshing rotor, a foraminous cylindrical cage surrounding said rotor with radial openings therein, means for inducing axial flow of crop material through said cage upon rotation of said rotor, a plurality of fingers shiftably supported on the periphery of said cage for movement between a flow retarding position in which said fingers extend into the interior of said cage and a retracted position in which said fingers are substantially withdrawn from the interior of said cage, motion transmitting means connected to said fingers operable to move said fingers from their retracted position to said retarding position, and means for controlling said motion transmitting means from a position remote from said fingers.

* * * * *